US010735697B2

(12) United States Patent
Zhou

(10) Patent No.: US 10,735,697 B2
(45) Date of Patent: Aug. 4, 2020

(54) PHOTOGRAPHING AND CORRESPONDING CONTROL

(71) Applicant: Beijing Zhigu Rui Tuo Tech Co., Ltd, Beijing (CN)

(72) Inventor: Hanning Zhou, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 192 days.

(21) Appl. No.: 15/100,293

(22) PCT Filed: Nov. 6, 2014

(86) PCT No.: PCT/CN2014/090434
§ 371 (c)(1),
(2) Date: May 27, 2016

(87) PCT Pub. No.: WO2015/078275
PCT Pub. Date: Jun. 4, 2015

(65) Prior Publication Data
US 2017/0006262 A1 Jan. 5, 2017

(30) Foreign Application Priority Data
Nov. 30, 2013 (CN) .......................... 2013 1 0631920

(51) Int. Cl.
*H04N 7/18* (2006.01)
*H04N 5/232* (2006.01)
(Continued)

(52) U.S. Cl.
CPC ............. *H04N 7/188* (2013.01); *H04L 67/32* (2013.01); *H04N 5/232* (2013.01); *H04N 5/23203* (2013.01); *H04N 7/08* (2013.01)

(58) Field of Classification Search
CPC .... H04N 5/232; H04N 5/23203; H04N 7/188; H04N 7/08; H04L 67/32
(Continued)

(56) References Cited

U.S. PATENT DOCUMENTS 6,504,571 B1   1/2003  Narayanaswami et al.
9,602,867 B2   3/2017  Sung et al.
(Continued)

FOREIGN PATENT DOCUMENTS

CN   101127893 A   2/2008
CN   101938617 A   1/2011
(Continued)

OTHER PUBLICATIONS

International Search Report for PCT Patent Application No. PCT/CN2014/090434, dated Feb. 6, 2015, 2 pages.

*Primary Examiner* — Peet Dhillon
(74) *Attorney, Agent, or Firm* — Amin, Turocy & Watson, LLP

(57) ABSTRACT

This application provides a photographing method and a control device, and relate to the field of communications. The photographing method comprises: a shutter triggering step of triggering a virtual shutter according to a first input instruction of a user; an information recording step of recording photographing related information at a moment of triggering the virtual shutter; a request sending step of sending a photo obtaining request to a server, where the photo obtaining request comprises the photographing related information; and a photo obtaining step of receiving at least one photo provided by the server according to the photo obtaining request. The photographing method and the control device provide convenience for a user to photograph and obtain an interested photo from a photo library, so as to improve user experience.

20 Claims, 5 Drawing Sheets

(51) Int. Cl.
*H04L 29/08* (2006.01)
*H04N 7/08* (2006.01)

(58) Field of Classification Search
USPC .......................................................... 348/143
See application file for complete search history.

(56) References Cited

U.S. PATENT DOCUMENTS

| | | | | |
|---|---|---|---|---|
| 2007/0025711 A1* | 2/2007 | Marcus | ................... | G03B 29/00 |
| | | | | 396/56 |
| 2010/0214398 A1* | 8/2010 | Goulart | .............. | H04N 21/6131 |
| | | | | 348/61 |
| 2011/0150434 A1* | 6/2011 | Takano | .............. | H04N 21/8146 |
| | | | | 386/328 |
| 2013/0005294 A1* | 1/2013 | Levinson | ................. | H04N 7/18 |
| | | | | 455/404.2 |
| 2013/0173603 A1* | 7/2013 | Hamilton | .......... | G06F 17/30268 |
| | | | | 707/723 |
| 2015/0116501 A1* | 4/2015 | McCoy | ................... | H04N 7/181 |
| | | | | 348/169 |
| 2016/0105644 A1* | 4/2016 | Smith | ................ | H04N 5/23206 |
| | | | | 348/159 |

FOREIGN PATENT DOCUMENTS

| | | |
|---|---|---|
| CN | 101997869 A | 3/2011 |
| CN | 202587163 U | 12/2012 |
| CN | 103149788 A | 6/2013 |
| CN | 103332150 A | 10/2013 |
| CN | 103685946 A | 3/2014 |

\* cited by examiner

… (1)

PHOTOGRAPHING AND CORRESPONDING CONTROL

RELATED APPLICATION

The present application is a U.S. National Stage filing under 35 U.S.C. § 371 of international patent cooperation treaty (PCT) application No. PCT/CN2014/090434, filed Nov. 6, 2014, and entitled "PHOTOGRAPHING AND CORRESPONDING CONTROL", which claims the benefit of priority to Chinese Patent Application No. 201310631920.9, filed on Nov. 30, 2013, which applications are hereby incorporated into the present application by reference herein in their respective entireties.

TECHNICAL FIELD

This application relates to the field of communications technologies, and in particular, to a photographing and corresponding control.

BACKGROUND

With popularization of single-lens reflex cameras, pocket cameras, and smartphones and tablet computers with a video shooting function, more persons enjoy pleasures of photographing and 'selfie' shots.

During a selfie, a person usually places a camera at a predetermined location, and then completes the selfie by using a delayed photographing function of the camera. However, this selfie manner usually encounters a problem of an undesirable camera shooting angle. For example, the location which may be provided for placing the camera is insufficiently high.

A public camera, such as a security monitoring camera or a transportation monitoring camera, is generally disposed at a good shooting location, and shoots a person or an object within a shooting visual field thereof at a fixed shooting frequency. However, today there is no effective way of obtaining a photo in which a user is interested from a public camera.

SUMMARY

An example, non-limiting objective of one or more embodiments of this application is to provide a photographing method and a control device, so as to provide convenience for a user to obtain an interested photo in a photo library.

According to an aspect of an example embodiment of this application, a photographing method is provided, where the method comprises:

a shutter triggering step of triggering a virtual shutter according to a first input instruction of a user;

an information recording step of recording photographing related information at a moment of triggering the virtual shutter;

a request sending step of sending a photo obtaining request to a server, where the photo obtaining request comprises the photographing related information; and a photo obtaining step of receiving at least one photo provided by the server according to the photo obtaining request.

According to another aspect of an example embodiment of this application, a control device is provided, where the control device comprises:

a shutter triggering module, configured to trigger a virtual shutter according to a first input instruction of a user;

an information recording module, configured to record photographing related information at a moment of triggering the virtual shutter;

a request sending module, configured to send a photo obtaining request to a server, where the photo obtaining request comprises the photographing related information; and a photo obtaining module, configured to receive at least one photo provided by the server according to the photo obtaining request.

According to another aspect of an example embodiment of this application, a computer readable storage device is provided, comprising at least one executable instruction, which, in response to execution, causes a control device comprising a processor to perform operations, comprising:

a shutter triggering step of triggering a virtual shutter according to a first input instruction of a user;

an information recording step of recording photographing related information at a moment of triggering the virtual shutter;

a request sending step of sending a photo obtaining request to a server, where the photo obtaining request comprises the photographing related information; and a photo obtaining step of receiving at least one photo provided by the server according to the photo obtaining request.

According to another aspect of an example embodiment of this application, a control device is provided, characterized by comprising a processor and a memory, the memory storing computer executable instructions, the processor being connected to the memory through a communication bus, and when the control device operates, the processor executing the computer executable instructions stored in the memory, so that the control device executes operations, comprising:

a shutter triggering step of triggering a virtual shutter according to a first input instruction of a user;

an information recording step of recording photographing related information at a moment of triggering the virtual shutter;

a request sending step of sending a photo obtaining request to a server, where the photo obtaining request comprises the photographing related information; and a photo obtaining step of receiving at least one photo provided by the server according to the photo obtaining request.

In the photographing method and the control device of example embodiments of this application, photographing related information at a moment of triggering a virtual shutter of the control device is recorded, and a corresponding photo is obtained from a server of a camera according to the photographing related information, thereby providing convenience for a user to obtain an interested photo from a photo library of the server, so as to improve user experience.

DETAILED DESCRIPTION

The detailed description of this application is further described in detail hereinafter in connection with accompanying drawings and embodiments. The following embodiments are intended to describe this application, but not intended to limit the scope of this application.

Persons skilled in the art may understand that, terms such as "first", and "second" in this application are only intended to distinguish different steps, devices or modules, and neither represent any specific technical meaning, nor denote any inevitable logic sequence between them.

The "virtual shutter" in this application may be a physical key, such as a physical shutter key on device; or may also be a virtual key, such as a shutter key displayed on a device screen; or may be corresponding to any other interaction interface which may receive a user input, such as corresponding to an image collecting interface, a text input interface, or a voice collecting interface.

Figure 1:
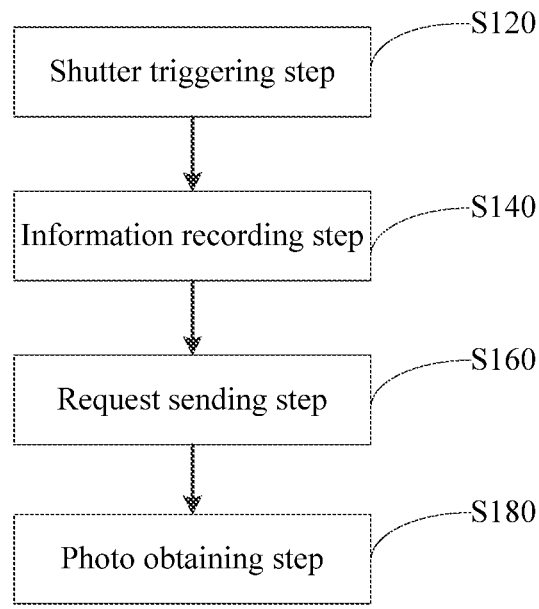
FIG. 1 is a flowchart of the photographing method according to an embodiment of this application.

In many application scenarios, such as in a scenic area, a user cannot obtain a photo in which the user is interested due to the limitation of a shooting location or a shooting device; the user may complete the photographing with the aid of a public camera or the like. That is to say, when a person enters the shooting visual field area of the public camera, the person may be automatically shot by the public camera. Therefore, by using the public camera, a user may, for example, obtain an optional selfie effect. However, how to obtain a photo in which a user is interested from a photo library of the public camera is not currently solved. Therefore, an embodiment of this application provides a photographing method, and as shown in FIG. 1, the method comprises:

S120: Trigger a virtual shutter according to a first input instruction of a user.

S140: Record photographing related information at a moment of triggering the virtual shutter.

S160: Send a photo obtaining request to a server, where the photo obtaining request comprises the photographing related information.

S180: Receive at least one photo provided by the server according to the photo obtaining request.

In a method of an embodiment of this application, a user triggers a virtual shutter at a location at which the user intends to photograph, and a device automatically records current photographing related information, and then may obtain a photo in which the user is interested from a server according to the photographing related information, so that the user may complete the photographing by using a photographing device such as a public camera or an ordinary camera of another person without photographing limitation of a photographing location and a photographing device, and conveniently obtain a photo in which the user is interested from the server, thereby improving user experience.

Specifically, in the step S120, the first input instruction comprises: at least one of a key instruction, a voice instruction, a gesture instruction, an expression instruction, and a flashing instruction. Generally, the form of the first input instruction is corresponding to the form of the virtual shutter. That is to say, when the virtual shutter is a physical key or a virtual key, the first input instruction may be the key instruction, for example, the user presses the physical key or the virtual key with a finger; when the virtual shutter is corresponding to a voice collecting interface, the first input instruction may be the voice instruction, for example, the user says "press the shutter" toward the collecting interface; when the virtual shutter is corresponding to a gesture collecting interface, the first input instruction may be the gesture instruction, for example, the user gives a sliding gesture toward the gesture collecting interface to serve as the gesture instruction; when the virtual shutter is corresponding to an image collecting interface, the first input instruction may be the expression instruction, for example, the user laughs loudly or makes faces toward the image collecting interface to serve as the expression instruction; when the virtual shutter is a light induction apparatus, the first input instruction may be the flashing instruction, for example, the user triggers a light-emitting diode (LED) on a device to flash, thereby triggering the virtual shutter.

In the step S140, the photographing related information comprises: information about time of triggering the virtual shutter (briefly called triggering time information below) and location information of the user. The location information of the user may be obtained by using a positioning technology such as global positioning system (GPS).

In the step S160, the server comprises a database, the database is used to store a photo taken and uploaded by at least one camera, and the camera may be a public camera, or may also be an individual ordinary camera. Additionally, besides storing the photo, the server further stores metadata of the photo, and the metadata comprises: shooting time information of the photo, and shooting location information, that is, information about the location at which a camera shoots the photo. The server may be corresponding to one camera, or may also be corresponding to multiple cameras. Table 1 shows an example of a storage table of the photos and the metadata, where the server is corresponding to multiple cameras, that is, cameras A, B, and C, and each camera may be corresponding to a different photo at a different shooting time, for example, camera A is corresponding to photos 101, 102, 104, and 105.

TABLE 1

Storage table of photos and metadata

| Photo | Shooting time | Shooting location | Shooting camera |
|---|---|---|---|
| Photo 101 | 20121106-10:11:01 | (29.16, 88.51) | Camera A |
| Photo 102 | 20131006-10:11:01 | (29.16, 88.51) | Camera A |
| Photo 104 | 20131006-10:11:02 | (29.16, 88.51) | Camera A |
| Photo 105 | 20131006-10:11:04 | (29.16, 88.51) | Camera A |
| Photo 201 | 20131006-10:11:01 | (29.16, 85.51) | Camera B |
| Photo 304 | 20130907-10:11:11 | (29.16, 68.51) | Camera C |

The step S160 may be instantly completed after the shutter is triggered, that is, executed closely following the step S120 and step S140, and in this situation, the user may almost immediately obtain a corresponding photo after the virtual shutter is triggered.

Alternatively, the step S160 may also be not instantly completed after the shutter is triggered, that is, executed after a period of time since the shutter is triggered, for example, the user may trigger the virtual shutter in a scenic area, and execute the step S160 after going back to the residence to connect with WIFI. In this way, when the user photographs in a scenic area, the user does not need to communicate with a server, so no network traffic is generated without the need of network support.

In an example embodiment, the step S180 is: receive an original image of the photo provided by the server according to the photo obtaining request.

In another example embodiment, the step S180 comprises:

S181: Receive a thumbnail of the photo provided by the server according to the photo obtaining request.

S182: Send an original image obtaining request to the server according to a second input instruction of the user.

S183: Receive an original image of the photo provided by the server according to the original image obtaining request. In the foregoing two example embodiments, a manner in which the server provides the thumbnail or original image may be that the server pushes the thumbnail or original image to a device of the user, or may also be that a device of the user pulls the thumbnail or original image from the server.

In the latter example embodiment, the user may decide, according to the thumbnail, whether to further download the original image. When the user needs to select part of photos from many photos, the use of the example embodiment may reduce unnecessary original image downloading, thereby reducing network traffic, and may save user time.

After receiving the photo obtaining request, the server searches for, according to the photo obtaining request, a photo which needs to be provided to the user in step S180, that is, searches for, according to the triggering time information and the location information of the user in the photo obtaining request, a photo which needs to be provided, and the search process is as follows:

S210: Search for a photo corresponding to the shooting time information matched with the triggering time information, and form a first photo set. Generally, if the shooting frequency of the camera is sufficiently high, the triggering time information and the shooting time information should be considered as matched only when they are the same, that is, precisely matched. With reference to Table 1, it is assumed that the triggering time information is 20131006-10:11:01, and it may be determined that the first photo set comprises photos 102, and 201. If the shooting frequency of the camera is insufficiently high, or, the camera does not perform consecutive shooting in a period of time, fuzzy matching may also be performed between the triggering time information and the shooting time information. Still with reference to Table 1, it is assumed that the triggering time information is 20131006-10:11:00, and it is assumed that according to a fuzzy matching rule, corresponding shooting time information in a predetermined error time around the triggering time information, such as 2 seconds, is considered as matched shooting time information, and it may be determined that the first photo set comprises photos 102, 104, and 201.

Additionally, the matching relationship between the triggering time information and the shooting time information may be different in dependence on different triggering modes, and the following makes detailed description.

S220: Search for a photo corresponding to the shooting location information matched with the location information of the user, and form a second photo set. The matching relationship between the location information of the user and the shooting location information needs to first ensure that the location information of the user is corresponding to a visual field area of at least one camera, that is, the user is located in a visual field area of at least one camera. Additionally, when the location information of the user is corresponding to visual field areas of multiple cameras, it should be ensured that the found photo is taken by a camera closest to the user. The visual field area of each camera is pre-stored by the server. With reference to table 1, continuously it is assumed that user coordinates corresponding to the location information of the user are (29.16, 89.51), according to the pre-stored visual field area of the camera, the location information of the user is corresponding to visual field areas of both camera A and camera B, and meanwhile, the user coordinates are obviously closer to camera A, so in this case the second photo set should comprise photos 101, 102, 104, and 105.

S230: Take a photo in an intersection set of the first photo set and the second photo set as a photo which needs to be sent. The foregoing assumption continues, it may be determined that the photo in an intersection set of the first photo set and the second photo set is photo 102, and the photo 102 is the photo which needs to be provided.

Figure 2A:
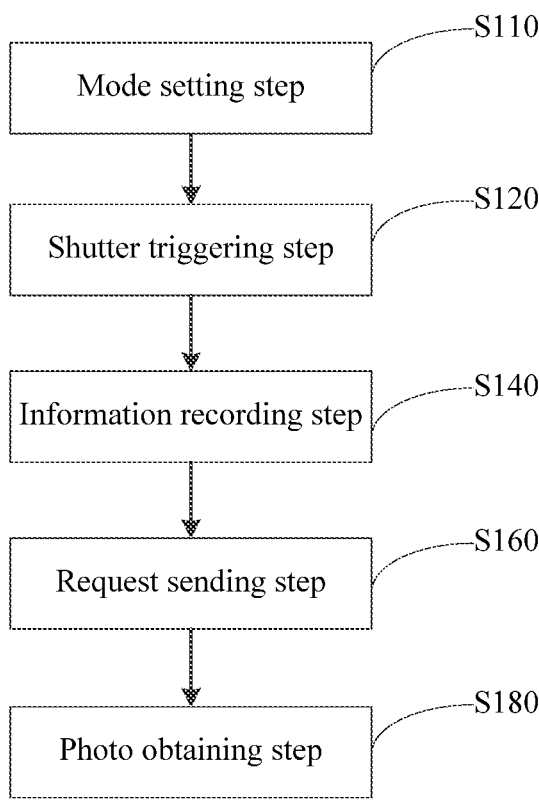
FIG. 2a is a flowchart of the photographing method according to another embodiment of this application.

Referring to FIG. 2a, in order to further improve user experience, in another embodiment of this application, before the step S120, the method may further comprise:

S110: Set the triggering mode of the virtual shutter. In the step, the triggering mode may be selected and set according to a third input instruction of the user, and the triggering mode may also be preset during device delivery.

Correspondingly, in the foregoing step S120, the virtual shutter is triggered in the set triggering mode according to the first input instruction.

The triggering mode may comprise, for example, an instant triggering mode, a delayed triggering mode, and a retroactive triggering mode.

Specifically, the step S120 may comprise: triggering the virtual shutter in an instant triggering mode according to the first input instruction. In the instant triggering mode, a moment when the user operates (such as, presses) the virtual shutter is recorded as the triggering time, and the triggering time is a time point; correspondingly, the server places a photo corresponding to a shooting time the same as the triggering time into the first photo set, and each camera is generally only corresponding to one photo.

Alternatively, the step S120 may comprise: triggering the virtual shutter at least once in a delayed triggering mode according to the first input instruction. In the delayed triggering mode, a first predetermined period of time (such as 10 seconds) is delayed backward from the moment when the user operates the virtual shutter; in the first predetermined period of time, the virtual shutter may be triggered once or multiple times (such as triggered once per second, or 10 times in 10 seconds), and a time point at which the virtual shutter is triggered every time is recorded as the triggering time, and if the virtual shutter is triggered multiple times, the photographing related information comprises multiple triggering times. Correspondingly, the server places photos corresponding to shooting times the same as the multiple triggering times into the first photo set, and each camera is generally corresponding to multiple photos.

Alternatively, the step S120 may comprise: triggering the virtual shutter at least once in a retroactive triggering mode according to the first input instruction. In the retroactive triggering mode, a second predetermined period of time (such as 5 seconds) is retroacted forward from the moment when the user operates the virtual shutter; in the second predetermined period of time, the virtual shutter may be triggered once or multiple times (such as triggered once per second, or 5 times in 5 seconds), and a time point at which the virtual shutter is triggered every time is recorded as the triggering time, and if the virtual shutter is triggered multiple times, the photographing related information comprises multiple triggering times. Correspondingly, the server places photos corresponding to shooting times the same as the multiple triggering times into the first photo set, and each camera is generally corresponding to multiple photos. It should be understood that, the triggering here is only virtual triggering, that is, one or more corresponding triggering times are generated. In the triggering mode, although the shooting time at which the user intends to obtain photos is before the triggering time, when the camera is a public camera which performs consecutive shooting, the server pre-stores these photos, so the user may still obtain these photos which are taken at a "past time".

Figure 2B:
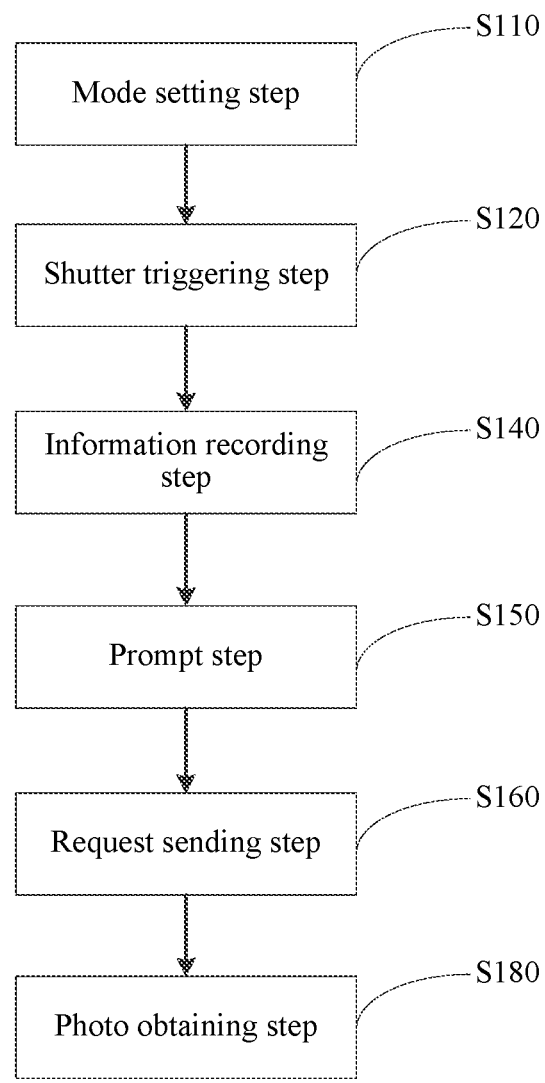
FIG. 2b is a flowchart of the photographing method according to a third embodiment of this application.

Referring to FIG. 2b, in still another embodiment of this application, the method may further comprise:

S150: Judge whether the related photo to be obtained exists according to the photographing related information, and outputting prompt information according to a judging result.

Specifically, the location information of the user in the photographing related information may be compared with the visual field area of the camera, so as to judge whether the user location is within the visual field area of the camera; if not, which indicates that the camera cannot shoot the user, it may be prompted that a related photo cannot be obtained by currently triggering the virtual shutter, or otherwise, it may be prompted that a related photo may be obtained by currently triggering the virtual shutter. Additionally, the triggering time information in the photographing related information may be individually or further compared with the work time of the camera, so as to judge whether the triggering time is within the work time range of the camera; if not, which indicates that the camera does not work at the triggering time, it may be prompted that a related photo cannot be obtained by currently triggering the virtual shutter, or otherwise, it may be prompted that a related photo may be obtained by currently triggering the virtual shutter. When the user cannot obtain a related photo, the prompt information may further give a reason that a related photo cannot be obtained, such as "the shooting location is not within the visual field area of the camera", or "the camera is currently not working", and according to the prompt information, the user may adjust the shooting location or shooting time of the user, thereby improving user experience.

It should be understood that, in one or more of the embodiments of this application, the value of the sequence number of each step does not indicate an execution order, and the execution order of the steps should be determined according to a function and an inherent logic thereof, and should not form any limit to the implementation process of one or more of the embodiments of this application.

In addition, an embodiment of the present application further provides a computer-readable medium, comprising a computer readable instruction when the following operations are executed: executing operations of steps S120, S140, S160 and S180 of the method in the embodiment shown in the above FIG. 1.

To sum up, in a photographing method of an embodiment of this application, the virtual shutter may be triggered by selecting different triggering modes, and then photographing related information to be applied is generated, so that the server may search for a corresponding photo according to the photographing related information and send the photo to the user, and the user may conveniently obtain one or more photos in which the user is interested from the photo library of the server, or even may obtain a photo which is taken at a "past time", thereby improving user experience.

Figure 3A:
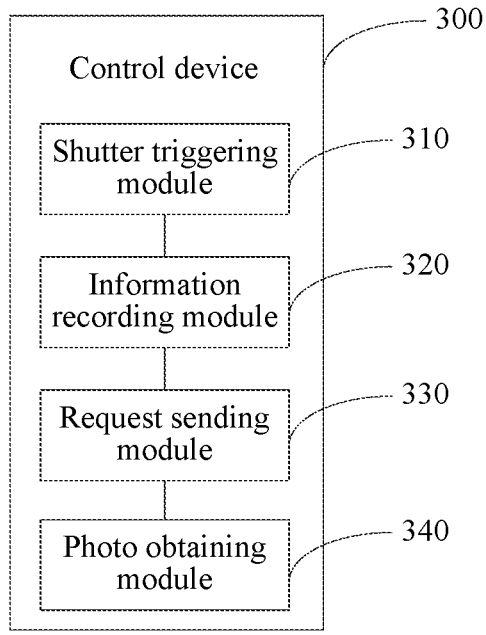
FIG. 3a is a schematic diagram of a module structure of the control device according to an embodiment of this application.

FIG. 3a is a schematic diagram of a module structure of the control device according to an embodiment of this application, where the control device may, for example, be a mobile terminal or not be a mobile terminal. In consideration of the portability requirement on the control device, the control device is optionally a mobile terminal, such as a smartphone, a tablet computer, or intelligent glasses.

Referring to FIG. 3a, the control device 300 comprises: a shutter triggering module 310, an information recording module 320, a request sending module 330 and a photo obtaining module 340.

The shutter triggering module 310 is configured to trigger a virtual shutter according to a first input instruction of a user.

The information recording module 320 is configured to record photographing related information at a moment of triggering the virtual shutter.

The request sending module 330 is configured to send a photo obtaining request to a server, where the photo obtaining request comprises the photographing related information.

The photo obtaining module 340 is configured to receive at least one photo provided by the server according to the photo obtaining request.

Specifically, the shutter triggering module 310 comprises an interaction interface, configured to receive the first input instruction of the user, where the first input instruction may comprise: at least one of a key instruction, a voice instruction, a gesture instruction, an expression instruction, and a flashing instruction. Correspondingly, the interaction interface may be a physical key, a virtual key, a voice collecting interface, a gesture input interface, an emotion input interface, a light induction interface or the like. For example, the physical key may be a fixed key on a smartphone. For example, the virtual key may be an icon key displayed on a touch screen of a smartphone. For example, the voice collecting interface may be a microphone of a smartphone. For example, the gesture input interface may be a sliding triggering icon displayed on a touch screen of a smartphone. For example, the emotion input interface may be a camera of a smartphone. For example, the light induction interface may be a light sensor on a mobile terminal.

The information recording module 320 comprises a memory, configured to record photographing related information at a moment of triggering the virtual shutter. The photographing related information comprises: information about time of triggering the virtual shutter (briefly called triggering time information below) and location information of the user. The location information of the user may be obtained from a positioning module of the control device, or, the information recording module 320 comprises a positioning unit. The positioning module or positioning unit may perform positioning by using the GPS technology.

The request sending module 330 comprises a communications unit, configured to send a photo obtaining request to a server, where the photo obtaining request comprises the photographing related information. The server comprises a database, the database is used to store a photo taken by at least one camera, and the camera may be a public camera, or may also be an individual ordinary camera. Additionally, besides storing the photo, the server further stores metadata of the photo, and the metadata comprises: shooting time information of the photo, and shooting location information, that is, information about the location at which a camera shoots the photo. The server may be corresponding to one camera, or may also be corresponding to multiple cameras. A storage table of the photos and the metadata is shown as Table 1, which is not described again.

Figure 3B:
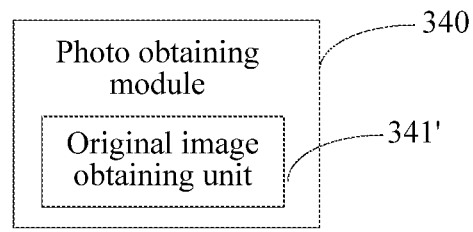
FIG. 3b is a schematic diagram of an internal module structure of the photo obtaining module in another embodiment of this application.

Referring to FIG. 3b, in an optional embodiment, the photo obtaining module 340 comprises an original image obtaining unit 341', configured to receive an original image of the photo provided by the server according to the photo obtaining request.

Figure 3C:
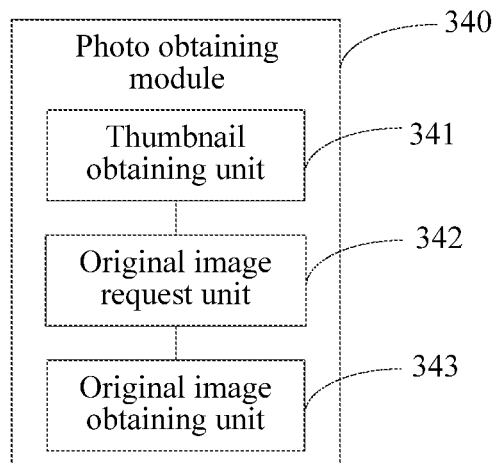
FIG. 3c is a schematic diagram of an internal module structure of the photo obtaining module in another embodiment of this application.

Referring to FIG. 3c, in another optional embodiment, the photo obtaining module 340 comprises:

a thumbnail obtaining unit 341, configured to receive a thumbnail of the photo provided by the server according to the photo obtaining request;

an original image request unit 342, configured to send an original image obtaining request to the server according to a second input instruction of the user; and an original image obtaining unit 343, configured to receive an original image of the photo provided by the server according to the original image obtaining request.

In the foregoing two example embodiments, a manner in which the server provides the thumbnail or original image to the control device may be that the server pushes the thumbnail or original image to the control device, or may also be that the control device pulls the thumbnail or original image from the server.

Because the size of the file of the thumbnail is far less than that of the original image, in the latter example embodiment, the user may decide, according to the thumbnail, whether to further download the original image. When the user needs to select part of photos from many photos, the use of the example embodiment may reduce unnecessary original image downloading, thereby reducing network traffic, and may save user time.

After receiving the photo obtaining request, the server searches for, according to the photo obtaining request, a photo which needs to be provided to the control device, that is, searches for, according to the triggering time information and the location information of the user in the photo obtaining request, a photo which needs to be provided, and the search process is like what is described in the method embodiment, and is not described again.

Figure 3D:
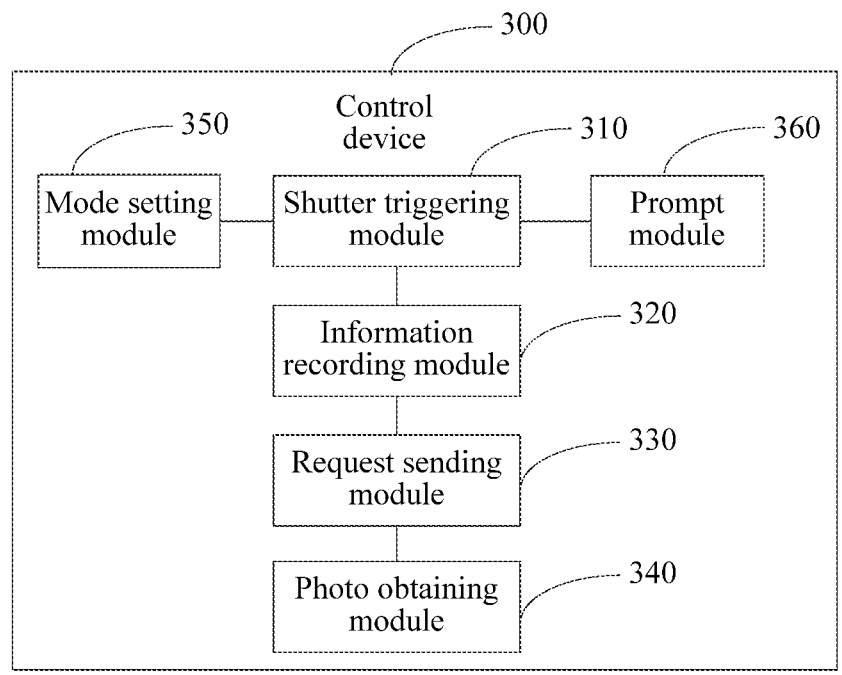
FIG. 3d is a schematic diagram of a module structure of the control device according to another embodiment of this application.

Referring to FIG. 3d, in another embodiment of this application, the control device 300 further comprises: a mode setting module 350 and a prompt module 360.

The mode setting module 360 is configured to set a triggering mode of the virtual shutter. The triggering mode may be selected and set according to a third input instruction of the user, and the triggering mode may also be preset during device delivery.

Correspondingly, the shutter triggering module 310 triggers the virtual shutter in the set triggering mode according to the first input instruction.

The triggering mode may comprise, for example, an instant triggering mode, a delayed triggering mode, a retroactive triggering mode and the like.

Specifically, the shutter triggering module 310 may trigger the virtual shutter in the instant triggering mode according to the first input instruction. In the instant triggering mode, a moment when the user operates (such as, presses) the virtual shutter is recorded as the triggering time, and the triggering time is a time point; correspondingly, the server places a photo corresponding to a shooting time the same as the triggering time into the first photo set, and each camera is generally only corresponding to one photo.

Alternatively, the shutter triggering module 310 may trigger the virtual shutter at least once in a delayed triggering mode according to the first input instruction. In the delayed triggering mode, a first predetermined period of time (such as 10 seconds) is delayed backward from the moment when the user operates the virtual shutter; in the first predetermined period of time, the virtual shutter may be triggered once or multiple times (such as triggered once per second, or 10 times in 10 seconds), and a time point at which the virtual shutter is triggered every time is recorded as the triggering time, and if the virtual shutter is triggered multiple times, the photographing related information comprises multiple triggering times. Correspondingly, the server places photos corresponding to shooting times the same as the multiple triggering times into the first photo set, and each camera is generally corresponding to multiple photos.

Alternatively, the shutter triggering module 310 may trigger the virtual shutter at least once in a retroactive triggering mode according to the first input instruction. In the retroactive triggering mode, a second predetermined period of time (such as 5 seconds) is retroacted forward from the moment when the user operates the virtual shutter; in the second predetermined period of time, the virtual shutter may be triggered once or multiple times (such as triggered once per second, or 5 times in 5 seconds), and a time point at which the virtual shutter is triggered every time is recorded as the triggering time, and if the virtual shutter is triggered multiple times, the photographing related information comprises multiple triggering times. Correspondingly, the server places photos corresponding to shooting times the same as the multiple triggering times into the first photo set, and each camera is generally corresponding to multiple photos. It should be understood that, the triggering here is only virtual triggering, that is, one or more corresponding triggering times are generated. In the triggering mode, although the shooting time at which the user intends to obtain photos is before the triggering time, when the camera is a public camera which performs consecutive shooting, the server pre-stores these photos, so the user may still obtain these photos which are taken at a "past time".

The prompt module 360 is configured to judge whether the related photo to be obtained exists according to the photographing related information, and output prompt information according to a judging result.

Specifically, the prompt module 360 may compare the location information of the user in the photographing related information with the visual field area of the camera to judge whether the user location is within the visual field area of the camera; and if not, which indicates that the camera cannot shoot the user, and may prompt that a related photo cannot be obtained by currently triggering the virtual shutter, or otherwise, may prompt that a related photo may be obtained by currently triggering the virtual shutter. Additionally, the triggering time information in the photographing related information may be individually or further compared with the work time of the camera, so as to judge whether the triggering time is within the work time range of the camera; if not, which indicates that the camera is currently not working, it may be prompted that a related photo cannot be obtained by currently triggering the virtual shutter, or otherwise, it may be prompted that a related photo may be obtained by currently triggering the virtual shutter. When the user cannot obtain a related photo, the prompt information may further give a reason that a related photo cannot be obtained, such as "the shooting location is not within the visual field area of the camera", or "the camera is currently not working", and according to the prompt information, the user may adjust the shooting location or shooting time of the user, thereby improving user experience.

Figure 4:
FIG. 4 is a schematic diagram of an application scenario of the photographing method according to an embodiment of this application.

FIG. 4 is a schematic diagram of an application scenario of the photographing method according to an embodiment of this application. As shown in FIG. 4, a user 410 holds a smartphone 420 with a hand at a lakeside to enjoy the scenery, and in this case, the user 410 may intend to be capable of taking a photo for the user from a high location. Meanwhile, a public camera 430 is disposed at the lakeside, and the public camera 430 serves as a security monitoring camera and performs shooting at the lakeside at a fixed frequency. Consequently, the user 410 may start an APP in the smartphone 420, and then trigger a virtual shutter, and the smartphone 420 records current photographing related information (comprising information about time of triggering the virtual shutter and location information of the user). Then, the user may send a photo obtaining request to a server (not shown in FIG. 4) of the public camera 430 at the lakeside or after going back to the residence, and after receiving the request, the server sends, to the smartphone 420, a photo corresponding to a moment at which the user triggers the virtual shutter at the lakeside. It can be seen that, the user conveniently completes the photographing and photo obtaining process by using the smartphone of the user and the public camera, and the taken photo has an ideal shooting angle.

Figure 5:
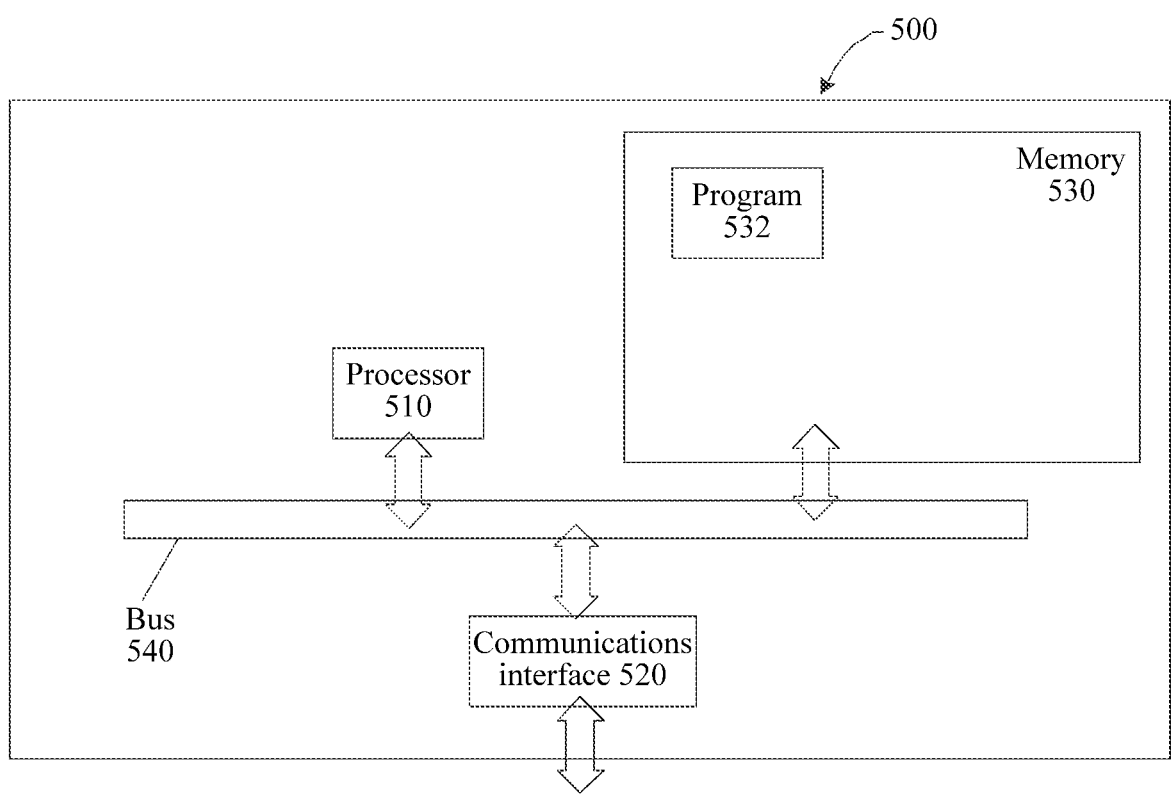
FIG. 5 is a schematic diagram of a hardware structure of the control device according to an embodiment of this application.

A hardware structure of the control device according to an embodiment of this application is shown in FIG. 5. The specific embodiment of this application does not limit specific implementation of the control device, and referring to FIG. 5, the control device 500 may comprise:

a processor 510, a communications interface 520, a memory 530, and a communications bus 540.

The processor 510, the communications interface 520, and the memory 530 communicate with each other through the communications bus 540.

The communications interface 520 is configured to communicate with another network element such as a server.

The processor 510 is configured to execute a program 532, and may specifically execute related steps in the method embodiments shown in FIG. 1.

Specifically, the program 532 may comprise program code, where the program code comprises a computer operation instruction.

The processor 510 may be a central processing unit CPU, or an application specific integrated circuit (ASIC), or one or more integrated circuits that are configured to implement an embodiment of this application.

The memory 530 is configured to store the program 532. The memory 530 may comprise a high-speed RAM memory, and may further comprise a non-volatile memory), for example, at least one disk memory. The program 532 specifically may execute the following steps:

a shutter triggering step of triggering a virtual shutter according to a first input instruction of a user;

an information recording step of recording photographing related information at a moment of triggering the virtual shutter;

a request sending step of sending a photo obtaining request to a server, where the photo obtaining request comprises the photographing related information; and a photo obtaining step of receiving at least one photo provided by the server according to the photo obtaining request.

For specific implementation of steps in the program 532, reference may be made to related steps or modules in the foregoing embodiment, which is not described herein. It can be clearly understood by persons skilled in the art that, for the purpose of convenient and brief description, as for a specific working process of the foregoing device and module, reference can be made to the corresponding process in the foregoing method embodiments, and the details are not described herein again.

A person of ordinary skill in the art may be aware that, in combination with the examples described in one or more of the embodiments disclosed in this specification, units and method steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

When the functions are implemented in a form of a software functional unit and sold or used as an independent product, the functions may be stored in a computer-readable storage medium. Based on such an understanding, the technical solutions of this application essentially, or the part contributing to the prior art, or part of the technical solutions may be implemented in the form of a software product. The computer software product is stored in a storage medium, and comprises several instructions for instructing a computer device (which may be a personal computer, a controller, a network device, and the like) to perform all or a part of the steps of a method described in an embodiment of this application. The foregoing storage medium comprises: any medium that can store program codes, such as a USB flash disk, a removable hard disk, a read-only memory (ROM), a random access memory (RAM), a magnetic disk, or an optical disk.

The foregoing example embodiments are merely intended for describing this application rather than limiting this application. A person of ordinary skill in the art should understand that modifications and variations may still be made without departing from the spirit and scope of this application. Therefore, all equivalent technical solutions shall fall within the scope of this application, and the patent protection scope of this application shall be subject to the claims.

What is claimed is:

1. A method, comprising:
   triggering, by a device comprising a processor, a virtual shutter according to at least one input instruction of a user, wherein the triggering of the virtual shutter comprises:
   triggering the virtual shutter at least once in a retroactive triggering mode according to the at least one input instruction, wherein the at least one input instruction comprises a flashing instruction, and
   in the retroactive triggering mode, the input instruction indicates one or more moments that are previous to a moment of the triggering of the virtual shutter;

recording, by the device, photographing related information at the moment of the triggering the virtual shutter, where the photographing related information comprises a location of the user and information about the one or more moments;

sending, by the device, a photo obtaining request for a photo of the location of the user to a server, where the photo obtaining request comprises the photographing related information; and receiving, by the device from the server according to the photo obtaining request, at least one photo of the location of the user that was captured by one or more other devices at the location of the user and at the one or more moments, wherein, in response to the location information of the user corresponding to visual field areas of multiple other devices of the one or more other devices, the at least one photo is taken by another device closest to the user selected from the multiple other devices.

2. The method of claim 1, further comprising:
determining whether the at least one photo to be obtained exists according to the photographing related information, and outputting prompt information according to a result of the determining.

3. The method of claim 1, wherein the at least one input instruction further comprises at least one of a key instruction, a voice instruction, a gesture instruction, or an expression instruction.

4. The method of claim 1, wherein the triggering the virtual shutter further comprises triggering the virtual shutter in an instant triggering mode according to the first input instruction.

5. The method of claim 1, wherein the triggering the virtual shutter further comprises triggering the virtual shutter at least once in a delayed triggering mode according to the at least one input instruction.

6. The method of claim 4, wherein, before the triggering, the method further comprises:
setting triggering modes of the virtual shutter.

7. The method of claim 1, wherein the receiving the at least one photo comprises receiving at least one original image of the at least one photo provided by the server according to the photo obtaining request.

8. The method of claim 1, where the receiving the at least one photo comprises:
receiving at least one thumbnail of the at least one photo provided by the server according to the photo obtaining request;
sending an original image obtaining request to the server according to the at least one input instruction; and
receiving at least one original image of the at least one photo provided by the server according to the original image obtaining request.

9. A device, comprising:
a memory that stores executable modules; and
a processor, coupled to the memory, that executes the executable modules to perform operations of the device, the executable modules comprising:
a shutter triggering module configured to trigger a virtual shutter according to at least one input instruction of a user, wherein, the trigger of the virtual shutter comprises:
the trigger of the virtual shutter at least once in a retroactive triggering mode according to the at least one input instruction, wherein the at least one input instruction comprises a flashing instruction, and in the retroactive triggering mode, the input instruction indicates one or more moments that are previous to moment of the triggering of the virtual shutter;
an information recording module configured to record photographing related information at the moment of the virtual shutter being triggered, where the photographing related information comprises a location of the user and information about the one or more moments;
a request sending module configured to send a photo obtaining request for a photo of the location of the user to a server, wherein the photo obtaining request comprises the photographing related information; and
a photo obtaining module configured to receive, from the server according to the photo obtaining request, the photo of the location of the user that were captured by one or more other devices at the location of the user and at the one or more moments, wherein, in response to the location information of the user corresponding to visual field areas of multiple other devices of the one or more other devices, the at least one photo is taken by another device closest to the user selected from the multiple other devices.

10. The device of claim 9, wherein the control device further comprises:
a prompt module configured to judge whether the photo to be obtained exists according to the photographing related information, and output prompt information according to a result of the judging.

11. The device of claim 9, wherein the control device further comprises:
a mode setting module configured to set a triggering mode of the virtual shutter.

12. The device of claim 11, wherein the shutter triggering module is further configured to trigger the virtual shutter in the triggering mode according to the first input instruction associated with the user.

13. The device of any one of claim 9, where the photo obtaining module comprises:
an original image obtaining unit configured to receive an original image of the photo received from the server according to the photo obtaining request.

14. The device of claim 9, where the photo obtaining module comprises:
a thumbnail obtaining unit configured to receive a thumbnail of the photo received from the server according to the photo obtaining request;
an original image request unit configured to send an original image obtaining request to the server according to an input instruction of the at least one input instruction; and
an original image obtaining unit configured to receive an original image of the photo received from the server according to the original image obtaining request.

15. The device of claim 9, where the device is a mobile terminal.

16. A non-transitory computer readable medium, comprising at least one executable instruction, which, in response to execution, causes a device comprising a processor to perform operations, comprising:
triggering a virtual shutter according to at least one input instruction of a user, wherein the triggering of the virtual shutter comprises:
triggering the virtual shutter at least once in a retroactive triggering mode according to the at least one input instruction, wherein the at least one input instruction comprises a flashing instruction, and in the retroactive triggering mode, the input instruction indicates one or more moments that are previous to a moment of the triggering of the virtual shutter;

recording photographing related information at the moment of the triggering the virtual shutter, where the photographing related information comprises a location of the user and information about the one or more moments;

sending a photo obtaining request for a photo of the location of the user to a server, wherein the photo obtaining request comprises the photographing related information; and receiving, from the server according to the photo obtaining request, at least one photo of the location of the user that were captured by one or more other devices at the location of the user and at the one or more moments, wherein, in response to the location information of the user corresponding to visual field areas of multiple other devices of the one or more other devices, the at least one photo is taken by another device closest to the user selected from the multiple other devices.

17. A device, comprising a processor and a memory, the memory storing executable instructions, the processor being connected to the memory through a communication bus, and when the device operates, the processor executes the executable instructions stored in the memory resulting in the device performing operations, comprising:

a shutter triggering step of triggering a virtual shutter according to at least one input instruction of a user, wherein the triggering of the virtual shutter comprises: triggering the virtual shutter at least once in a retroactive triggering mode according to the at least one input instruction, wherein the at least one input instruction comprises a flashing instruction, and in the retroactive triggering mode, the input instruction indicates one or more moments that are previous to a moment of the triggering of the virtual shutter;

an information recording step of recording photographing related information at the moment of the triggering the virtual shutter, where the photographing related information comprises a location of the user and information about the one or more moments;

a request sending step of sending a photo obtaining request for a photo of the location of the user to a server, wherein the photo obtaining request comprises the photographing related information; and a photo obtaining step of receiving, from the server according to the photo obtaining request, the photo of the location of the user that were captured by one or more other devices at the location of the user and at the one or more moments, wherein, in response to the location information of the user corresponding to visual field areas of multiple other devices of the one or more other devices, the at least one photo is taken by another device closest to the user selected from the multiple other devices.

18. The device of claim 17, wherein the operations further comprise:

determining whether the photo to be obtained exists according to the photographing related information, and outputting prompt information according to a result of the determining.

19. The device of claim 17, wherein the at least one input instruction further comprises at least one of a key instruction, a voice instruction, a gesture instruction, or an expression instruction.

20. The non-transitory computer readable medium of claim 16, wherein the input instruction further comprises at least one of a key instruction, a voice instruction, a gesture instruction, or an expression instruction.

* * * * *